United States Patent [19]

Cesa et al.

[11] Patent Number: 5,706,078
[45] Date of Patent: Jan. 6, 1998

[54] PHOTOGRAPHIC PRINTER AND METHOD FOR MONOLINE PRINTING

[75] Inventors: Flavio Cesa, Codroipo; Franca Degani, Udine; Luciano Malisan, Pordenone; Eni Scodellaro, Spilimbergo, all of Italy

[73] Assignee: San Marco Imaging Srl, Italy

[21] Appl. No.: 629,881

[22] Filed: Apr. 10, 1996

[30] Foreign Application Priority Data

Apr. 19, 1995 [IT] Italy .................. UD95A0074

[51] Int. Cl.$^6$ .................................................. G03G 27/46
[52] U.S. Cl. .................................................. 355/72; 355/73
[58] Field of Search ........................ 355/200, 72, 73; 346/136; 347/16, 104, 153, 164, 221, 139, 262, 264; 226/117, 118, 97; 358/302

[56] References Cited

U.S. PATENT DOCUMENTS

| | | | |
|---|---|---|---|
| 3,818,493 | 6/1974 | Slack | 347/153 |
| 4,147,427 | 4/1979 | Stewart | 355/72 |
| 4,234,261 | 11/1980 | Hendrischk et al. | 400/621 |
| 4,429,988 | 2/1984 | Okabe | 355/28 |
| 5,181,066 | 1/1993 | Ozawa et al. | 355/72 |
| 5,187,531 | 2/1993 | Ozawa et al. | 355/308 |
| 5,412,451 | 5/1995 | Suzuki | 355/72 |
| 5,511,713 | 4/1996 | Sakaguchi et al. | 226/118 |

FOREIGN PATENT DOCUMENTS

| | | |
|---|---|---|
| 0611983 | 8/1994 | European Pat. Off. |
| 0615154 | 9/1994 | European Pat. Off. |
| 1274125 | 11/1989 | Japan |
| 363148 | 3/1991 | Japan |

*Primary Examiner*—Joan H. Pendegrass
*Assistant Examiner*—Quana Grainger
*Attorney, Agent, or Firm*—Adams & Wilks

[57] ABSTRACT

A photographic printer for monoline printing on a photosensitive paper comprises an assembly for feeding and positioning the paper, a printing device for printing on the paper and a shearing member for shearing the paper. The feeding and positioning assembly comprises a first pair of opposed loading rollers and a second pair of opposed drawing rollers defining a paper transporting path of the photosensitive paper. At least the second pair of drawing rollers is mounted for rotation in forward and reverse directions and independently actuable in a stepwise manner. A buffer-stock chamber is disposed between the first and second pairs of rollers and is located in cooperation with the paper transporting path. A supporting member cooperates with an open end of the buffer-stock chamber to support the paper.

40 Claims, 2 Drawing Sheets

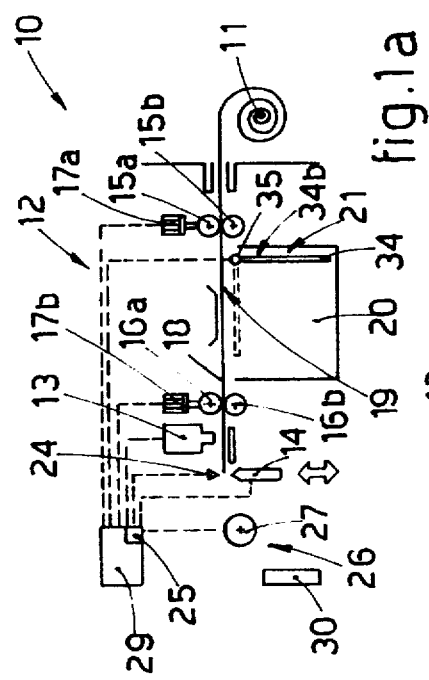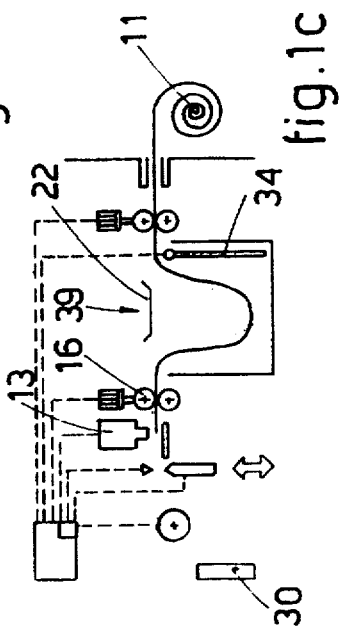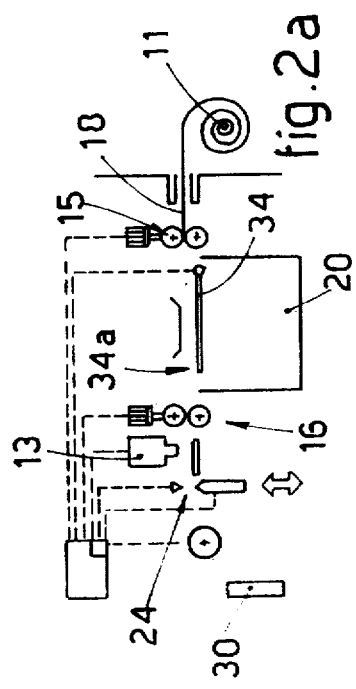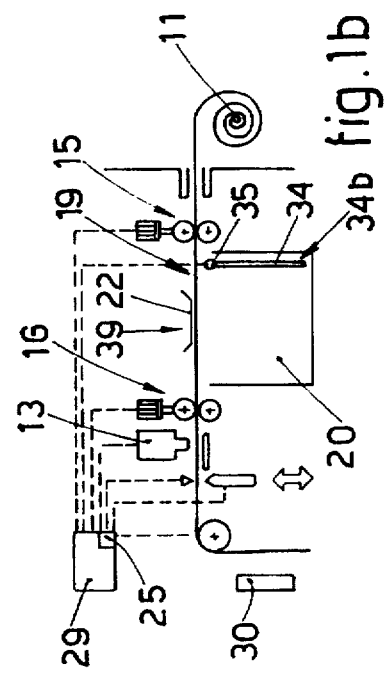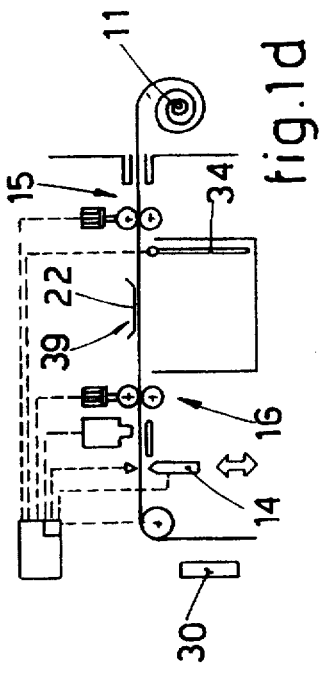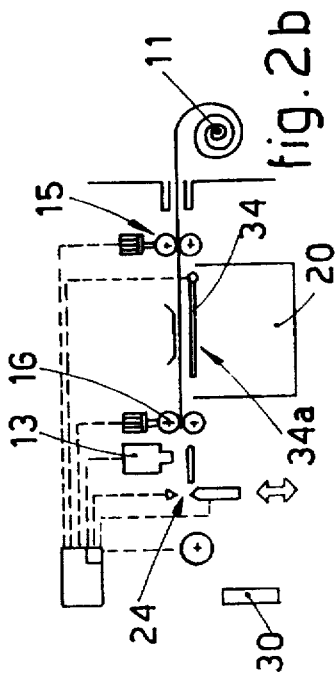

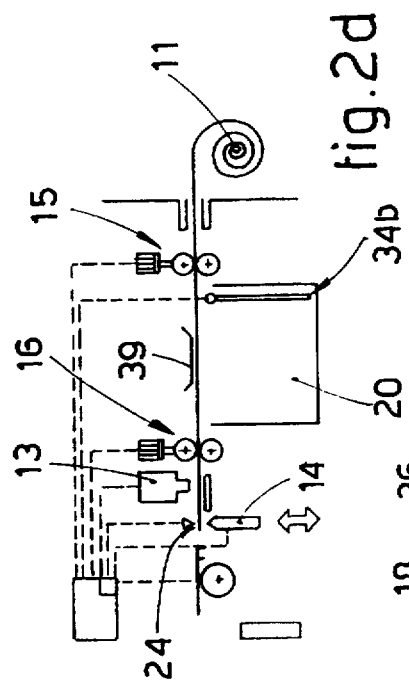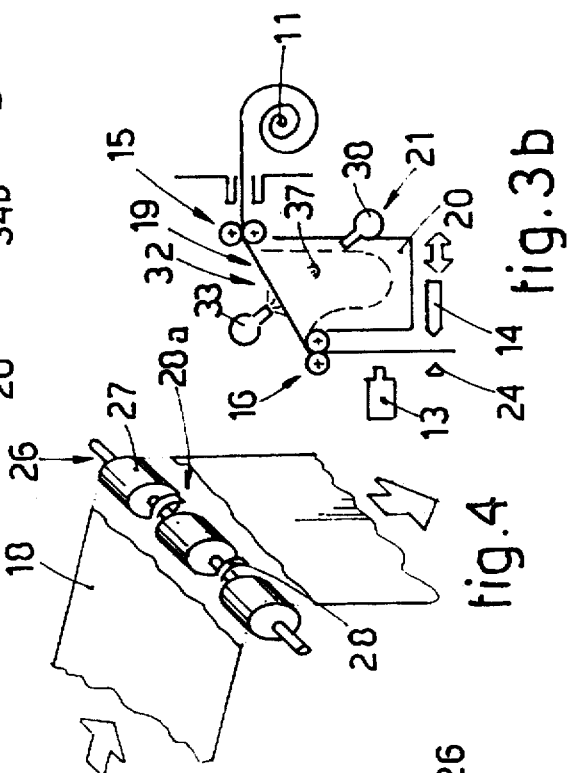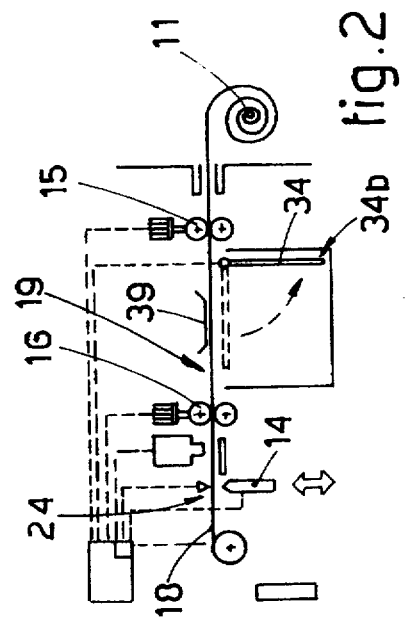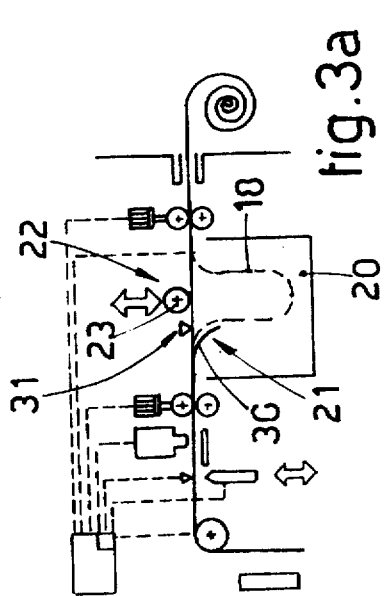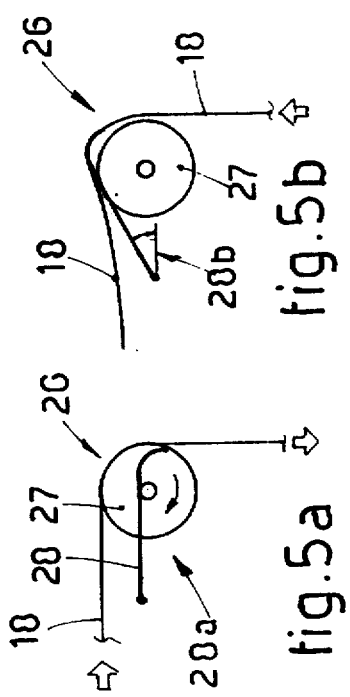

PHOTOGRAPHIC PRINTER AND METHOD FOR MONOLINE PRINTING

BACKGROUND OF THE INVENTION

1. Field of the Invention

The present invention concerns a photographic printer and the relative printing method, as set forth in the respective main claims.

The photographic printer according to the invention is employed to print, on photosensitive paper fed from a continuous wound roll, computer images according to the so-called monoline system, whereby the printing is carried out line by line by making the paper run step-by-step below the printing device.

The printer according to the invention can be used by itself or in combination with a normal photogram printer and is installed upstream of the developing baths and drying means.

2. Description of the Related Art

The printing of photographs from images created or integrated by means of a computer is more and more often used in the field of photographic printing on photosensitive paper besides the traditional optical printing from negatives.

Whereas in the printing from a negative the printing of the photosensitive paper is obtained in one single step with the impression of the complete image on a sheet of paper, in printing from a computer the so-called monoline printing can be employed whereby the image is printed line by line by means of a step-by-step feed of the sheet of the photosensitive paper.

With the monoline printing system it is very important that the photosensitive paper should be fed extremely accurately so as to achieve a satisfactory result and to prevent any slipping of the photosensitive paper which could lead to the superimposing or displacement of the lines of print.

In order to achieve the foregoing results, a reserve stock of photosensitive paper has to be created within the printer in the known printers of the monoline type, this stock being independent of the roll of paper being fed so as to prevent an uneven feed of the paper during the printing step owing to an uneven friction of the paper being moved.

One type of printers of the state of the art fed from continuous rolls of photosensitive paper and used for monoline printing includes a pair of opposed rollers of which at least one is powered, these rollers drawing the photosensitive paper into a buffer-stock chamber along a segment which is approximately the desired segment by unrolling the roll of paper.

The photosensitive paper is then drawn back so as to identify accurately its leading edge and is then fed forwards again by means of the pair of rollers by a length equal to the length of the photograph to be printed.

At this point the sheet of photosensitive paper is drawn back step by step so as to print the desired image line by line and is then again fed forwards through an opening or outlet slit so as to be fed to the operations downstream of the printing.

These state of the art printers have shown a series of problems linked above all to the fact that the photosensitive paper is rolled up and unrolled several times without being guided into the buffer-stock chamber, thereby often generating folds or crumpled portions which make the finished product unacceptable.

During the discharge step in these state of the art printers, the photosensitive paper has to follow a path different from that followed during the other feeding steps, thereby requiring auxiliary guide elements which have to be actuated in this discharge step and thereby also making the printer complicated, expensive and subject to obstructions and ill-functioning.

Moreover, the friction generated by the photosensitive paper on the feeding means, on the sidewalls of the buffer-stock chamber and on the guide elements may lead to the generation of faults on the photosensitive paper which damage the finished product.

Furthermore, the output of these printers is very low owing to the great number of operations required for carrying out each printing cycle.

SUMMARY OF THE INVENTION

The present applicants have designed, tested and embodied this invention to overcome the shortcomings of the state of the art and to achieve further advantages.

This invention is set forth and characterized in the respective main claims, while the dependent claims describe variants of the idea of the main embodiment.

The purpose of this invention is to provide a photographic printer employed in monoline printing on photosensitive paper fed from a continuous wound roll, the printer ensuring an accurate feed of the photosensitive paper during the printing step and reducing considerably the length of this cycle of feeding, and positioning and printing in such a way as to increase the output of the printer.

In the printer according to the invention, the photosensitive paper is not subject to folds or crumpled portions which could lead to the blockage of the printer or could ruin the photosensitive paper with a resulting production of poor-quality finished products.

In the printer according to the invention the path of the photosensitive paper both during the feeding step and in the printing step is substantially free, and the causes of friction or rubbing against the elements forming the printer are considerably reduced so as to ensure the desired accuracy of feed and positioning of the photosensitive paper.

Moreover, the auxiliary tension of the photosensitive paper during the printing step is precisely that generated by the paper itself and therefore can be controlled and foreseen at all times.

The printing cycle which can be obtained with the printer according to the invention is much simpler and much shorter than that of the printers of the state of the art.

The printer according to the invention is fed from a continuous roll of photosensitive paper and includes an assembly performing the feeding and positioning of the paper, this assembly comprising a first pair of rollers to load the paper and a second pair of rollers to draw the paper.

In the printer according to the invention at least the second pair of drawing rollers is actuated independently of the first pair of loading rollers.

In the printer according to the invention at least the second pair of drawing rollers is actuated at least momentarily with a controlled step and is capable of two-way motion.

In the printer according to the invention the two pairs of rollers define a plane of running of the paper which may be horizontal, vertical or inclined.

According to the invention the second pair of drawing rollers acts also as a means to measure the paper unrolled.

A buffer-stock chamber is included at an intermediate position between the two pairs of rollers and can contain a segment of paper of a desired length.

In the buffer-stock chamber according to the invention the segment of paper of a desired length is free and is subject only to the action of its own weight, which makes the paper form a loop having a substantially U-shaped configuration, thus preventing unnatural folds, crumpled portions or obstructions.

At the buffer-stock chamber the printer according to the invention advantageously includes supporting means which support the paper being fed during the preliminary step of loading the paper.

The supporting means has the task of ensuring that the leading edge of the paper is gripped by the second pair of drawing rollers.

According to a first embodiment, the supporting means are stationary and are suitably shaped to accompany the paper being fed and to prevent the paper from being inserted into the buffer-stock chamber during the preliminary step of loading the paper.

According to another form of embodiment these supporting means can be momentarily actuated and have at least one first working position, in which they cooperate with the paper being fed and accompany the paper until it cooperates with the pair of drawing rollers, and a second inactive position, in which the paper is free to enter the buffer-stock chamber.

According to another variant, the supporting means comprises a jet of air which can be actuated momentarily and directed suitably.

At a position corresponding with the supporting means and on the opposite side of the plane of running of the paper, the printer according to the invention may include switch means which have the purpose of directing the paper into the buffer-stock chamber when so required by the printing cycle.

The switch means may be of a mechanical type and may be stationary or movable.

According to a variant the switch means are of a pneumatic type and consist, for instance, of a suitably directed jet of air or of negative pressure means.

Downstream of the assembly that feeds and positions the paper, the printer according to the invention comprises a device for the monoline printing of the paper, sensors which monitor the leading edge of the paper and means to shear the paper.

The printer according to the invention is associated advantageously with a programming, control and actuation assembly which governs the actuation of the pairs of rollers, the printing device and the shearing means. The programming, control and actuation assembly is associated with the sensors which monitor the position of the leading edge of the paper.

The printer according to the invention may comprise further means to support and/or switch the paper which reduce to a minimum the friction of the paper and thus ensure a regular and accurate feed thereof.

The printer according to the invention has a preliminary step of loading photosensitive paper from a continuous roll, this preliminary step includes:

the feeding of the paper by a first pair of loading rollers until the leading edge of the paper cooperates with the second pair of drawing rollers, the paper cooperating advantageously with the supporting means;

the possible halting of the supporting means when the supporting means are of a pneumatic type, or else the displacement of the supporting means to their inactive position so as to free the access to the buffer-stock chamber;

the forward feeding of the paper by means of the first pair of loading rollers and the second pair of drawing rollers until the paper has passed beyond the shearing means by a desired pre-set segment;

the shearing of the leading segment of paper to be eliminated.

The printer according to the invention is now ready to carry out the printing method comprising the following steps:

the forward feeding of the photosensitive paper by a length equal to that of the desired printing by means of the actuation of the first pair of loading rollers and of the second pair of drawing rollers;

the clamping of the first pair of loading rollers;

the actuation of the second pair of drawing rollers in the opposite direction by a controlled step and the simultaneous printing of the paper; the paper moves backwards and is positioned within the buffer-stock chamber so as to form, under the action of its own weight, a loop having a natural substantially U-shaped configuration;

at the end of the printing, the forward actuation of the second pair of drawing rollers and the successive shearing of the paper, which is forwarded to the subsequent development steps.

According to a variant, the printer according to the invention includes also a sensor to monitor the tensioned paper, this monitor being positioned at an intermediate position between the two pairs of rollers so as to ensure that the paper is properly tensioned.

According to yet another variant, auxiliary supporting means to change the direction of the paper include chute means, which can be actuated momentarily and are actuated during the printing step so as to reduce to a minimum the friction between the paper being drawn back and the auxiliary supporting and direction-changing means.

According to a further variant, the printer according to the invention may include not only a printing device for monoline printing but also a traditional optical printing device fitted downstream or upstream of the monoline printing device.

In this case the paper for the optical printing is fed forwards directly by a length equal to that of the photograph to be printed and is positioned at a position corresponding to that of the optical printing device.

DESCRIPTION OF THE DRAWINGS

The attached figures are given as a non-restrictive example and show some preferred embodiments of the invention as follows:

FIGS. 1a to 1d show diagrammatically the printing method with a photographic printer according to the invention;

FIGS. 2a to 2d show diagrammatically the method of loading paper into the photographic printer of FIG. 1;

FIGS. 3a and 3b show diagrammatically two variants of the photographic printer of FIG. 1;

FIG. 4 is a three-dimensional view of a possible form of embodiment of the auxiliary supporting and direction-changing means;

FIGS. 5a and 5b gives side views of the auxiliary supporting and direction-changing means in two different positions.

DETAILED DESCRIPTION OF THE PREFERRED EMBODIMENTS

In this case a photographic printer 10 shown in the figures is suitable both for so-called monoline digital printing and for traditional optical printing.

The printer 10 according to the invention, which is described here only with reference to its characteristic elements, is fed from a continuous wound roll 11 of photosensitive paper 18 and includes an assembly 12 to feed and position paper, a monoline printing device 13 and a shearing means 14.

The feeding and positioning assembly 12 comprises two pairs of opposed rollers, which are respectively a first pair of loading rollers 15a, 15b and a second pair of drawing rollers 16a, 16b.

In this case each pair of rollers 15a, 15b and 16a, 16b is associated with its own independent motor 17a, 17b.

According to a variant, the pairs of rollers 15a, 15b and 16a, 16b are associated with one and the same motor and can be disconnected from each other at least momentarily by clutch means, for instance.

The motor 17b associated with the second pair of drawing rollers 16a, 16b is of a two-way type and is suitable to draw the photosensitive paper 18 with controlled steps.

These two pairs of rollers 15a, 15b, 16a, 16b defining a plane of running 19 of the paper 18 are distanced apart in cooperation with a buffer-stock chamber 20 in which the paper 18 can be freely arranged.

In the example of FIGS. 1 and 2 the plane of running 19 is substantially horizontal and the buffer-stock chamber 20 is positioned below that plane 19.

According to the variant shown in FIG. 3b the plane of running 19 is inclined.

According to yet another variant the plane of running 19 is vertical.

The feeding and positioning assembly 12 includes, in an intermediate position between the pairs of rollers 15a, 15b and 16a, 16b and in association with the buffer-stock chamber 20, supporting means 21 which uphold the paper 18 during the loading step.

In the example shown in FIGS. 1 and 2 the supporting means 21 consist of a movable platform 34 pivoted at 35 and having a first working position 34a (FIGS. 2a and 2b), in which the platform 34 cooperates with the moving paper 18 and prevents access to the buffer-stock chamber 20, and a second inactive position 34b, in which the platform 34 does not cooperate with the paper 18 but frees the access to the buffer-stock chamber 20.

According to the variant shown in FIG. 3a, the supporting means 21 consist of a suitably shaped stationary element 36, which in this case is shaped as an arc of a circle, accompanies the moving paper 18 and enables the paper 18 to spread into the buffer-stock chamber 20 when the paper 18 is in the step of being drawn backwards, as shown in dashed line in the figure.

According to another variant shown in FIG. 3b the supporting means 21 comprises a suitably directed jet of air 37 generated by a blowing means 38 which can be momentarily actuated.

In correspondence with the supporting means 21, the printer 10 according to the invention may include guide switch means 22, which directs the paper 18 into the buffer-stock chamber 20 when the paper 18 is in the step of being drawn backwards.

In the example shown in FIGS. 1a to 1d and 2a to 2d the switch means 22 consists of a stationary guide platform 39 positioned above the plane of running 19 of the paper 18.

According to a variant shown in FIG. 3a the switch means 22 comprise a vertically movable roller 23.

According to another variant shown in FIG. 3b the switch means 22 consist of a jet of air 32 produced by a suitably directed blowing means 33.

In this case, the printer 10 according to the invention includes the monoline printing device 13 positioned downstream of the feeding and positioning assembly 12.

Sensors 24 are included in association with the printing device 13 and detect the presence of the leading edge of the paper 18 and set to zero a metering means 25 associated with the motor 17b of the second pair of drawing rollers 16a, 16b.

In this case the printer 10 according to the invention includes auxiliary supporting and direction-changing means 26 consisting of rotary rollers 27 on which the photosensitive paper 18 runs.

In this example, the rotary rollers 27 include intermediate lifting-chute elements 28, which have a first inner retracted position 28a and a second outer raised position 28b.

When the intermediate lifting-chute elements 28 are in their first inner retracted position 28a, the paper 18 is supported on the rotary rollers 27 (FIG. 5a), whereas when the intermediate lifting-chute elements 28 are in their second outer raised position 28b, the paper 18 is raised from the rotary rollers 27 and slides on the intermediate lifting-chute elements 28 so as to reduce to a minimum the friction (FIG. 5b).

The printer 10 according to the invention is advantageously governed by a programming, control and actuation assembly 29.

In this case the printer 10 according to the invention includes also a traditional optical printing assembly 30.

The loading of the paper 18 into the printer 10 according to the invention comprises the following steps:

actuation of the pair of loading rollers 15a, 15b (FIG. 2a) and resulting forward movement of the paper 18, which is unrolled from the wound roll 11 until its leading edge is brought into cooperation with the second pair of drawing rollers 16a, 16b (FIG. 2b), the supporting platform 34 being in the first working position 34a (FIGS. 2a, 2b), or else the blowing means 38 constituting the supporting means 21 being in operation (FIG. 3b);

where the supporting means 21 can be momentarily actuated, actuation of the supporting means 21, which in this case consist of the movable platform 34 brought to its inactive position 34b (FIG. 2c), or else the halting of the blowing means 38 constituting the supporting means 21 (FIG. 3b);

actuation of the first pair of loading rollers 15a, 15b and of the second pair of drawing rollers 16a, 16b until the leading edge of the paper 18 has been brought beyond the shearing means 14 by a desired segment (FIG. 2c);

the shearing of the leading segment of paper 18, which is eliminated (FIG. 2d).

The printer 10 according to the invention now has (FIGS. 2d, 1a) the leading edge of the paper 18 coinciding with the sensors 24 and is ready to carry out the printing method by means of the monoline system comprising the following steps:

the setting to zero of the metering means 25 associated with the pair of drawing rollers 16a, 16b;

the forward feeding of the paper 18 by a length equal to that of the desired printing (FIG. 1d), the speed of the first pair of loading rollers 15a, 15b being advantageously, but not necessarily, greater than the speed of the second pair of drawing rollers 16a, 16b so as to release the paper 18 from the wound roll 11 and to prevent possible slipping of the paper 18 on the second pair of drawing rollers 16a, 16b;

clamping of the first pair of loading rollers 15a, 15b;

actuation of the second pair of drawing rollers 16a, 16b step-by-step in the opposite direction and simultaneous impression of the paper 18 by the printing device 13; during this step, the paper 18 thus drawn backwards cooperates with the switch means 22 and forms a loop within the buffer-stock chamber 20 (FIG. 1c);

at the end of the printing, the forward actuation of the second pair of drawing rollers 16a, 16b and the successive shearing of the paper 18, which is forwarded to the subsequent development steps (FIG. 1d).

These operation are repeated in each printing cycle.

According to a variant shown in FIG. 3a the printer 10 according to the invention includes a sensor 31 to monitor the tensioned paper at an intermediate position between the first pair of loading rollers 15a, 15b and the second pair of drawing rollers 16a, 16b, so as to ensure that the paper 18 thus fed is correctly positioned and tensioned.

In this case, the plane of running 19 of the paper 18 in the printer 10 of FIG. 3b is inclined and the step of printing is carried out on the paper 18 in a substantially vertical position.

We claim:

1. A photographic printer for printing according to the monoline technique on photosensitive paper, the printer being fed from a wound roll of continuous photosensitive paper and comprising: an assembly for feeding and positioning the paper, a printing device, and shearing means, wherein the feeding and positioning assembly comprises a first pair of opposed loading rollers and a second pair of opposed drawing rollers defining a plane of running of the photosensitive paper, at least the second pair of drawing rollers being at least momentarily actuable independently step-by-step and being mounted for rotation in forward and reverse directions, a buffer-stock chamber disposed in an intermediate position between the first and second pairs of rollers and being located in cooperation with the plane of running of the paper, and entry of the buffer-stock chamber cooperating at least momentarily with supporting means for supporting the paper.

2. A photographic printer as in claim 1, in which the supporting means is stationary and comprises a shaped element.

3. A photographic printer as in claim 1, in which the supporting means comprises a movable platform having at least a first working position and a second inactive position.

4. A photographic printer as in claim 1, in which the supporting means comprises a directed jet of air generated by blowing means.

5. A photographic printer as in any one of claims 1, 2, 3 or 4, further comprising switch means cooperating with the buffer-stock chamber and acting momentarily on the segment of paper present between the first and second pairs of rollers.

6. A photographic printer as in claim 5, in which the switch means comprises a stationary guide arranged so as to correspond with the buffer-stock chamber and located on the side of the plane of running opposite to that of the buffer-stock chamber.

7. A photographic printer as in claim 5, in which the switch means comprises an element mounted for movement along a direction substantially at a right angle to the plane of running of the paper and positioned so as to correspond with the buffer-stock chamber located on the opposite side of the plane of running of the paper therefrom.

8. A photographic printer as in claim 5, in which the switch means comprises pneumatic switch means for directing a jet of air on the segment of paper.

9. A photographic printer as in any one of claims 1, 2, 3 or 4, further comprising a programming, control and actuation assembly for controlling the operation of the photographic printer.

10. A photographic printer as in any one of claims 1, 2, 3 or 4, further comprising sensors to monitor the tension of the paper.

11. A photographic printer as in any one of claims 1, 2, 3 or 4, further comprising supporting and direction-changing means having rollers associated with intermediate lifting-chute elements having a first inner retracted position and a second outer raised position.

12. A digital printing method performed with the photographic printer of claim 1, comprising: a preliminary step of loading the paper and a printing step, the printing step including the steps of feeding the paper forwardly by means of the first pair of loading rollers and the second pair of drawing rollers along a segment equal to the length of the photograph to be printed;

clamping the first pair of loading rollers;

drawing the paper backwardly by means of the second pair of drawing rollers actuated with controlled steps while simultaneously printing on the paper by means of the printing device so that the paper is arranged in the buffer-stock chamber in the form of a loop having a substantially U-shaped configuration due to the weight of the paper;

moving the printed paper forwardly; and shearing the printed paper.

13. A digital printing method as in claim 12, in which the step of loading the paper comprises the steps of actuation of the pair of loading rollers until the leading edge of the paper is brought into cooperation with the second pair of drawing rollers, the paper during its forward movement cooperating with supporting means;

deactuation of the supporting means if of a momentarily actuable type;

actuation of the first pair of loading rollers and of the second pair of drawing rollers until the leading edge of the paper has been brought beyond the shearing means by a desired segment; and shearing and elimination of the leading segment of paper.

14. A digital printing method as in claim 12 or 13, in which at least at the beginning of the step of backward drawing of the paper, a switch means is actuated in the direction of switching the paper into the buffer-stock chamber.

15. A digital printing method as in claim 12 or 13, in which during the step of backward drawing of the paper, intermediate lifting-chute elements associated with rollers of a supporting and direction-changing means are brought to an outer raised position so as to release the paper from the rollers.

16. A photographic printer comprising:

a first pair of rollers for positioning and feeding photographic print paper from a photographic print paper supply magazine to a transporting path along a first direction;

a second pair of rollers for drawing the photographic print paper along the transporting path in the first direction and in a second direction opposite to the first direction;

driving means for rotatably driving the second pair of rollers in a forward direction to draw the photographic print paper in the first direction and in a reverse direction to draw the photographic print paper in the second direction;

a chamber disposed between the first pair of rollers and the second pair of rollers for receiving a portion of the photographic print paper when the photographic print paper is drawn in the second direction; and a printing device for printing a photographic image on the photographic print paper when the photographic print paper is drawn in the second direction.

17. A photographic printer according to claim 16; further comprising supporting means for supporting the photographic print paper along the transporting path when the photographic print paper is drawn in the first direction and permitting the chamber to receive a portion of the photographic print paper when the photographic print paper is drawn in the second direction.

18. A photographic printer according to claim 17; wherein the supporting means comprises a stationary element.

19. A photographic printer according to claim 18; wherein the stationary element has a curved portion for guiding the portion of the photographic print paper into the chamber when the photographic print paper is drawn in the second direction.

20. A photographic printer according to claim 17; wherein the supporting means comprises a movable platform movable between a first position, in which the platform supports the photographic print paper when the photographic print paper is drawn in the first direction, and a second position, in which the platform permits the chamber to receive a portion of the photographic print paper when the photographic print paper is drawn in the second direction.

21. A photographic printer according to claim 17; wherein the supporting means includes means for directing a jet of air to the photographic print paper.

22. A photographic printer according to claim 16; further comprising guiding means cooperating with the chamber for guiding the portion of the photographic print paper into the chamber when the photographic print paper is drawn in the second direction.

23. A photographic printer according to claim 22; wherein the guiding means comprises a stationary guiding element disposed over the photographic print paper and between the first and second pair of rollers.

24. A photographic printer according to claim 22; wherein the guiding means comprises a movable member mounted over the photographic print paper for movement in a direction generally perpendicular to at least a portion of the transporting path defined between the first and second pairs of rollers.

25. A photographic printer according to claim 24; wherein the movable member comprises a roller.

26. A photographic printer according to claim 22; wherein the guiding means comprises means for directing a jet of air to the photographic print paper.

27. A photographic printer according to claim 16; further comprising supporting and direction changing means disposed forwardly of the printing device for supporting and changing the direction of draw of the photographic print paper along the transporting path.

28. A photographic printer according to claim 27; wherein the supporting and direction changing means comprises at least one roller mounted for rotation at least in the forward direction, and a chute element mounted for movement between a first position and a second position; and wherein during drawing of the photographic print paper in the first and second directions along the transporting path, the roller supports the photographic print paper when the chute element is in the first position and the chute element supports the photographic print paper when the chute element is in the second position.

29. A photographic printer according to claim 16; further comprising monitoring means for monitoring the tension of the photographic print paper.

30. A photographic printer according to claim 29; wherein the monitoring means comprises a sensor disposed between the first and second pairs of rollers.

31. A photographic printer according to claim 16; further comprising a programming, control and actuation assembly for controlling the operation of the printing device.

32. A printing method comprising the steps of:

providing a photographic printer comprising first and second pairs of rollers defining a transporting path, a chamber disposed between the first and second pairs of rollers, a printing device, and a paper cutting device;

positioning and feeding a photographic print paper from a photographic print paper supply magazine to the transporting path by rotating the first pair of rollers in a first direction;

feeding a predetermined length of the photographic print paper equal to the length of the photographic image to be printed along the transporting path towards the printing device by rotating the first and second pairs of rollers in the first direction;

feeding the photographic print paper along the transporting path by rotating the second pair of rollers in a second direction opposite to the first direction to position a portion of the photographic print paper in the chamber while simultaneously operating the printing device to print a photographic image on the predetermined length of photographic print paper;

feeding the photographic print paper along the transporting path toward the paper cutting device by rotating the second pair of rollers in the first direction; and cutting the printed predetermined length of photographic print paper by means of the cutting device.

33. A printing method according to claim 32; wherein the providing step comprises providing a photographic printer having supporting means for supporting the photographic print paper along the transporting path when the photographic print paper is fed along the transporting path by rotating the first pair of rollers in the first direction; and the positioning and feeding step comprises rotating the first pair of rollers in the first direction until a leading edge of the photographic print paper is brought into engagement with the second pair of rollers while supporting the photographic print paper along the transporting path by means of the supporting means, rotating the first and second pairs of rollers in the first direction until a predetermined segment of the photographic print paper beyond the leading edge thereof is brought beyond the paper cutting device, and cutting the predetermined segment of photographic print paper by means of the paper cutting device.

34. A printing method according to claim 33; including the step of clamping the first pair of rollers to prevent rotation thereof before the step of feeding the photographic print paper along the transporting path by rotating the second pair of rollers in the second direction.

35. A printing method according to claim 34; wherein the providing step further comprises providing a photographic printer having guiding means cooperating with the chamber for guiding the portion of the photographic print paper into the chamber; and further including the step of guiding the portion of the photographic print paper into the chamber by means of the guiding means when the second pair of rollers are rotated in the second direction.

36. A printing method according to claim 34; wherein the providing step further comprises providing a photographic printer having supporting and direction changing means disposed forwardly of the printing device for supporting and changing a direction of feed of the photographic print paper along the transporting path, the supporting and direction changing means comprising at least one roller mounted for rotation in the first and second directions, and a chute element mounted for movement between a first position, in which the roller supports the photographic print paper, and a second position, in which the chute element supports the photographic print paper.

37. A printing method according to claim 36; including the step of moving the chute element to the second position thereof before the step of rotating the second pair of rollers in the second direction to position a portion of the photographic print paper in the chamber.

38. A printing method according to claim 37; including the step of clamping the first pair of rollers to prevent rotation thereof before the step of feeding the photographic print paper along the transporting path by rotating the second pair of rollers in the second direction.

39. A printing method according to claim 37; wherein the providing step comprises providing a photographic printer having guiding means cooperating with the chamber for guiding the portion of the photographic print paper into the chamber; and further including the step of guiding the portion of the photographic print paper into the chamber by means of the guiding means when the second pair of rollers are rotated in the second direction.

40. A printing method according to claim 32; wherein the providing step comprises providing a photographic printer having supporting and direction changing means disposed forwardly of the printing device for supporting and changing a direction of feed of the photographic print paper along the transporting path, the supporting and direction changing means comprising at least one roller mounted for rotation in the first and second directions, and a chute element mounted for movement between a first position, in which the roller supports the photographic print paper, and a second position, in which the chute element supports the photographic print paper; and further including the step of moving the chute element to the second position thereof before the step of rotating the second pair of rollers in the second direction to position a portion of the photographic print paper in the chamber.

* * * * *